United States Patent Office 2,843,387
Patented July 15, 1958

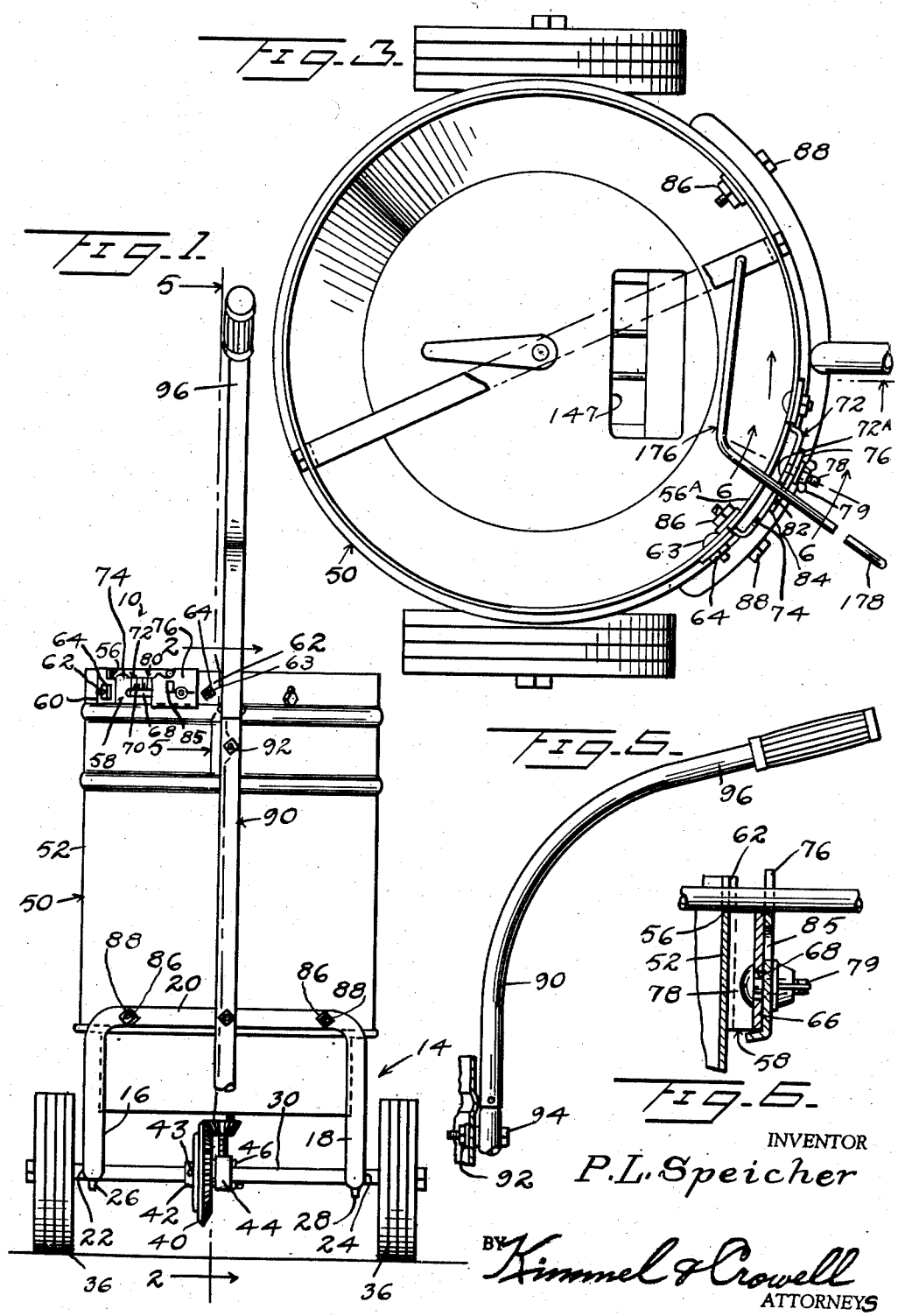

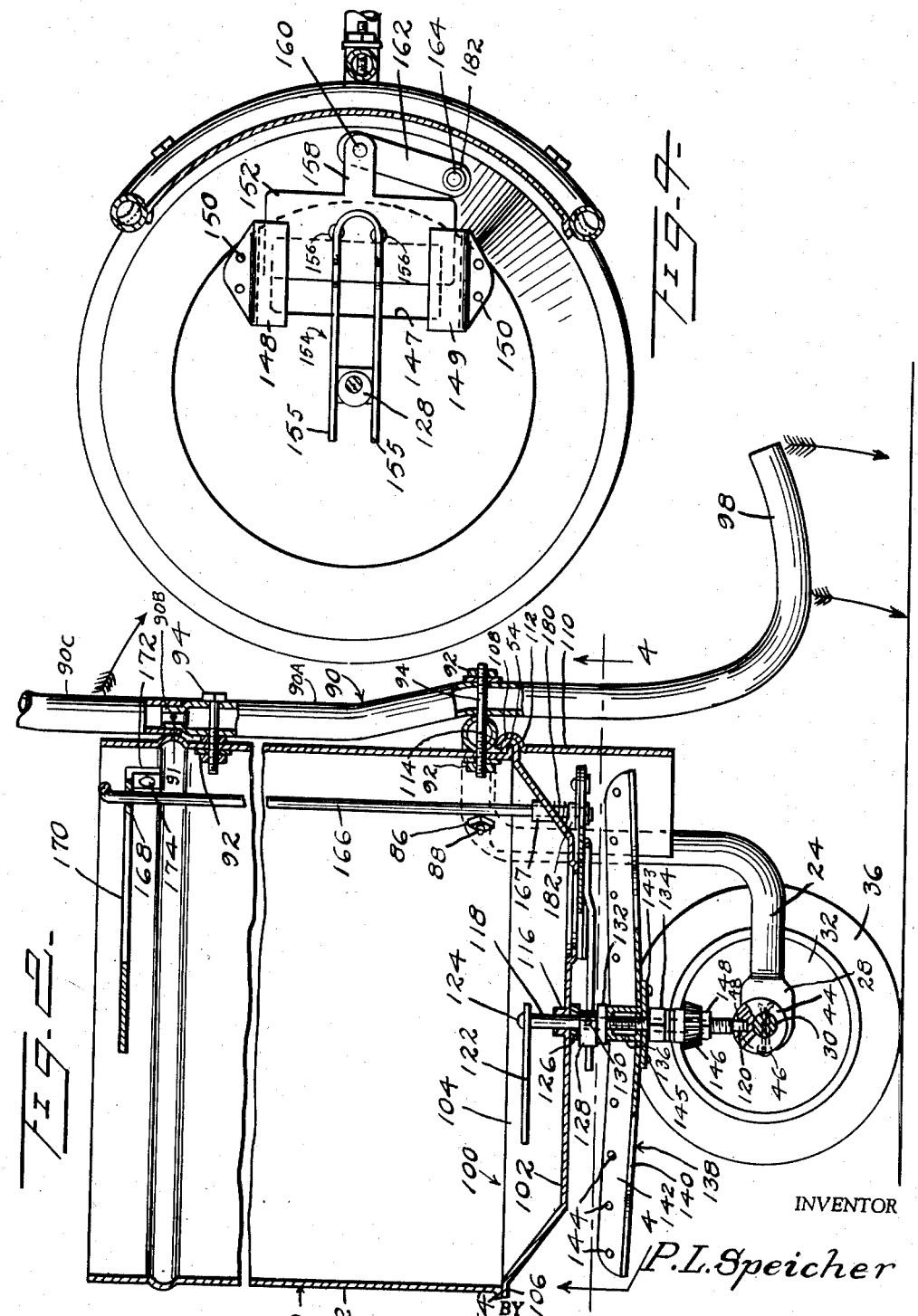

2,843,387

BROADCAST SEEDER OR SPREADER DEVICE

Paul L. Speicher, Urbana, Ind., assignor to The Cyclone Seeder Co., Inc., Urbana, Ind., a corporation of Indiana Application June 22, 1955, Serial No. 517,240

2 Claims. (Cl. 275—8)

This invention relates to a broadcast type of seeder or spreader, and more specifically, the invention pertains to a spreader device for seeds, fertilizer, dry weed killing material, lime, and other similar materials.

One of the primary objects of this invention is to provide means for insuring substantial equal distribution of material on opposite sides of a seeder or spreader constructed in accordance with this invention.

Another object of this invention is to provide in a seeder or spreading device, means controlling the flow of material to the impeller distributor thereof.

A further object of this invention is to provide in a broadcast type of seeder or spreader, means for controlling the flow of material to the impeller distributor.

Another object of this invention is to provide a broadcast type of seeder or spreader with indicia means for indicating the volume of the material flowing to the impeller distributor.

A still further object of this invention is to provide in a broadcast type of seeder or spreader, material agitating means and means for equally distributing the material to the impeller distributor.

Other and further objects and advantages of the present invention will become more evident from a consideration of the following specification when read in conjunction with the annexed drawings, in which:

Figure 1 is a rear end elevational view of a broadcast type of seeder or spreader constructed in accordance with the teachings of the present invention, with parts broken away.

Figure 2 is a cross-sectional view, partly in elevation, taken on the vertical plane of line 2—2 of Figure 1, looking in the direction of the arrows.

Figure 3 is a top plan view of the seeder or spreader illustrated in Figure 1, with parts broken away.

Figure 4 is a bottom plan view, partly in cross-section, taken on the horizontal plane of line 4—4 of Figure 2, looking in the direction of the arrows.

Figure 5 is an enlarged fragmentary detail view illustrating the details of the handle and its connection to the hopper.

Figure 6 is an enlarged detail cross-sectional view taken on the plane of line 6—6 of Figure 3, looking in the direction of the arrows.

Referring now more specifically to the drawings, reference numeral 10 designates, in general, a broadcast seeder or spreader constructed in accordance with this invention. The device is seen to comprise a substantially inverted U-shaped tubular chassis 14 having a pair of downwardly extending spaced and substantially parallel arms 16, 18 integrally connected adjacent their respective upper ends by means of a tubular arcuately offset transverse member 20. The arms 16, 18 are integrally formed with a pair of laterally and forwardly extending tubular extension elements 22 and 24, respectively, the elements terminating at their outer extremities in a pair of flat, spaced and substantially parallel bracket members 26 and 28, respectively. The bracket members 26, 28 are each provided with a centrally positioned opening, the openings being aligned with each other, in which a shaft 30 is journalled for rotation therein.

The shaft 30 projects beyond the remote sides of the bracket members 26, 28, and the extended ends thereof receive the wheels 32 of which one of the wheels is keyed or otherwise conventionally secured thereto in driving relation therewith. The wheels 32 may be provided with solid or pneumatic tires 36, if desired.

A bevelled ring gear 40 having an integrally formed hub 42 is mounted substantially centrally of the shaft 30. The gear 40 is fixedly secured on the shaft 30 by means of a cotter pin 43 which extends diametrically through the hub 42 and the shaft 30. A collar 44 is loosely mounted on the shaft 30 with one side thereof engaging the adjacent side of the hub 42 to prevent axial displacement thereof in the direction of the ring gear 40, and a cotter pin 46 extending diametrically through the shaft 30 prevents axial movement of the collar 44 in the other direction. As is seen in Figure 2 of the drawings, the collar 44 has a radially and inwardly extending bore 48 formed therein, to which further reference will be made below.

Reference numeral 50 designates, in general, a receptacle or hopper. The hopper 50 is seen to comprise an elongated cylindrical wall 52 having a pair of opposed open upper and lower ends. The lower end of the wall 52 terminates in a radially and outwardly extending flange 54, and the upper end thereof is provided with an elongated substantially U-shaped recess 56. An elongated substantially rectangular plate 58 having offset end tabs 60, 62 is secured to the upper end of the wall 52 adjacent the recess 56. The plate 58 is mounted therein by the bolts and nuts 63, 64, respectively, which pass through openings formed in the tabs 60, 62 and in the wall 52.

As is seen in Figures 3 and 6, the plate 58 has the central body portion 66 spaced laterally from the adjacent portion of the wall 52 and is provided with a horizontally extending substantially rectangular guide slot 68 above which is indented, impressed or embossed a plurality of scalar indicia 70. The upper end of the central body portion 66 is also formed with an elongated substantially U-shaped recess 72 substantially of the same length as the recess 56, and the horizontal portions thereof 56A and 72A respectively are disposed in substantially the same plane. An upwardly projecting lug 74 projects from the horizontal portion 72A adjacent one end thereof.

A substantially rectangular slide plate 76 is mounted on the central body portion 66 by the bolt 78 which extends through the slot 68 and the slide plate 76, the plate 76 being secured in adjusted position by means of a wing nut 79. The slide plate 76 has one of the upper corners notched at 80 and is provided with a lug 82 which projects upwardly from the base 84 thereof intermediate its ends.

The slide plate 76 is also provided with a substantially rectangular window opening 85 aligned with the indicia 70.

The wall 52 has the lower end thereof interfitted within the arcuate bight member 20 and is secured thereto by a plurality of nuts 86 and bolts 88. The arcuate transverse member 20 also has secured thereto the lower end 90A of a handle member 90 by the nuts 92 and bolts 94, and the upper end portion of the lower end 90A is secured to the upper end of the cylindrical wall 52 by similar fastening means. The upper end portion of the lower end 90A is reduced in diameter to form a neck 90B over which is telescoped the lower end portion of the upper end 90C of the handle 90, the telescoped ends being held in assembled position by a pin or bolt 91. The upper end 90C of the handle member 90 is bent rearwardly to form an operating lever 96, and the lower end thereof is also rearwardly bent to form a prop 98.

The lower end of the cylindrical wall 52 is provided with a closure member 100 having an inverted truncated conical configuration including a base member 102 from which outwardly flares a side wall 104, and the latter terminates in an annular flange 106 which abuts against the under side of the flange 54 and is reverted at 108 thereover. An arcuate apron 110 is provided with a laterally expressed portion 112 forming a groove to receive the adjacent portions of the reverted end 108. As is clearly seen in Figure 2, the upper end of the expressed portion 112 terminates in a lip or flange 114 which is clamped between the transverse member 20 and the reverted end 108 of the annular flange 106.

The base member 102 is provided with a centrally positioned upwardly projecting substantially hollow cylindrical boss 116 through which extends an elongated bolt 118 threaded along the major portion of the lower end thereof, and its lower end 120 is reduced in diameter and is journalled in the bore 48. An elongated agitator lever arm 122 has one of its ends fixedly secured, by conventional means 124 to the upper end of the bolt 118.

A stop nut 126 is threaded on the bolt 118 and engages against the under side of the base member 102. A cam 128 is mounted on the bolt 118 immediately below the nut 126 and is secured thereto for rotation therewith by set screw 130.

Nuts 132 and 134 threaded on the bolt 118 engage and clamp therebetween the upper and lower ends of an elongated substantially hollow cylindrical hub 136 forming a part of the impeller distributor 138. The impeller distributor is formed of a plurality of sector shaped plates 140 having vertically extending flanges 142 projecting therefrom along their respective longitudinally extending side edges. The plates 140 are assembled in a substantially circular configuration with the adjacent flanges of each adjacent pair of plates being secured to each other by rivets 144. The inner ends of the flanges 142 are received within suitable axially extending slots (not shown) and the inner ends of the plates 140 are connected to a circular disc 143 by rivets 145.

A bevelled gear 146 is mounted on the bolt 118 for rotation therewith and the downward displacement thereof is prevented by the stop nut 148, and the bevel gear 146 is meshed with the ring gear 40.

It will now be seen that rotation of the wheel 32 keyed to the shaft 30 effects the rotation which, in turn, rotates the ring gear 40. This rotary movement is transmitted to the bolt 118 through the bevel gear 146 and causes the rotation of the agitator lever 122, the cam 128, and the impeller dispenser 138.

An elongated substantially rectangular slot 147 is formed in the base member 102, and a pair of oppositely disposed spaced and confronting brackets 149 are fixedly secured to the underside of the base member 102 at opposite ends of the slot 147, respectively, by rivets 150. An elongated substantially rectangular closure plate 152 is loosely mounted between the brackets 149 and is adapted to extend across and close the slot 147. A U-shaped element 154 has the bight portion thereof welded at 156 to the underside of the plate 152, and the arms 155 thereof project laterally away from the plate 152 to engage opposite sides of the cam 128.

A lug 158 projects from the other side of the plate 152 and the free end thereof is pivoted on pin 160 to one end of an elongated link 162. The other end of the link 162 is fixedly secured at 164 with one end of an elongated shaft 166.

As is seen in Figure 2 of the drawings, the shaft 166 projects upwardly from the link 162 through an enlarged substantially hollow tubular boss 167 which projects upwardly from the side wall 104. The shaft 166, adjacent its upper end, extends through an aperture 168 formed adjacent one end of an elongated cross-bar 170, the ends of the latter being bent laterally to form a pair of oppositely disposed tabs 172 which are fixedly secured to the cylindrical wall by means of bolts 174. The upper end of the shaft 166 terminates in a crank arm 176 having a portion 178 thereof which is received within the recesses 56 and 72, the crank arm portion 178 engaging the bights 56A and 72A. The shaft 166 is constantly biased for movement downwardly by means of spring 180 which surrounds the lower end thereof and engages at one of its ends against the side wall 104 and abuts at its other end against the shaft connector element 182.

From the above described linkage, it will be understood that the rotation of the crank arm portion 178 in the recesses 56 and 72 will effect a swinging movement of the link 162 which will turn to move the plate 152 towards or away from the slot 147. Thus it is seen that the degree to which the slot 147 is opened or closed is controlled by the position of the crank arm portion 178. It will also be apparent that as the bolt 118 is rotated, the cam 128 also rotates and imparts oscillatory movement to the plate 152 about its pivot pin 160.

When the plate 152 is moved to its fully closed position, the crank arm portion 178 is disposed between the lug 74 and the adjacent end of the plate 58. However, when the handle portion 178 is moved in a direction to cause the plate 152 to be withdrawn away from the slot 147, the handle portion 178 is lodged behind the lug 74 and the adjacent portion of the end of the recess 72.

Prior to placing the above described seeder and spreader, the operator moves the slide plate to an adjusted position by reference to the indicia 70 observed through the window opening 85 after which the slide plate is locked in position by the wing nut 79. The crank arm portion 178 is then moved from behind the lug 74 and is placed behind the lug 82. The unit is then in a position to be operated.

Having described and illustrated one embodiment of this invention in detail, it will be understood that the same is offered merely for the purpose of example, and that the invention is to be limited only by the scope of the appended claims.

What is claimed is:

1. A broadcast seeding spreader comprising an inverted substantially U-shaped chassis including a pair of upright laterally spaced parallel tubular arm members having a transverse member integrally connecting the upper ends thereof, a pair of spaced parallel horizontal extensions integrally formed on the lower ends of said arms, an axle shaft extending between and journalled for rotation in the free end portions of said extensions, a wheel mounted on each end of said axle shaft exteriorly of said arm members, means keying said axle shaft for rotation to one of said wheels, a hopper for broadcast material secured to said chassis in vertically spaced relation above said axle shaft, a drive shaft extending through the bottom of said hopper and journalled for rotation therein, a collar journalled on said axle shaft, means in said collar journalling the lower end of said drive shaft, an impeller distributor fixedly mounted on said drive shaft below said hopper, an agitator arm fixedly secured to the upper end of said drive shaft within said hopper, a bevel gear fixedly mounted on said drive shaft adjacent to but spaced from said axle shaft, a ring gear fixedly secured to said axle shaft in meshing relation with said bevel gear whereby rotation of said axle shaft effects simultaneous rotation of said drive shaft, said agitator arm and said impeller distributor, said hopper having a slot formed in the bottom thereof above said impeller distributor, a pair of opposed spaced and confronting brackets secured to said hopper adjacent a pair of opposed ends of said slot, a plate loosely and slidably mounted within said brackets, means mounted on said hopper and connected with said plate to effect adjusting movement of said plate beneath said slot to close said slot on movement toward said drive shaft, a pair of elongated spaced parallel arms fixedly secured to and projecting from said plate, and a cam fixedly connected with said drive shaft for rotation therewith, said last named arms engaging opposite sides of said cam whereby on rotation of said cam said plate is oscillated in a direction generally transverse to the movement of said plate effected by means mounted on said hopper.

2. A broadcast seeding spreader as defined in claim 1 wherein said hopper is provided with a recess formed in the upper end portion thereof, an elongated substantially rectangular plate having a pair of offset ends, means fixedly securing the offset ends of said rectangular plate to said hopper adjacent said recess, said plate having an elongated horizontal slot formed therein, a first lug projecting integrally upwardly from said plate, a slide plate, means extending through said slot and connected with said slide plate for selectively securing said slide plate in adjusted position relative to said slot, a plurality of indicia disposed above said slot, said slide plate having an indicia viewing slot extending transversely therethrough, a second lug projecting upwardly from said slide plate adjacent an end thereof, a crank arm journalled in said hopper, said crank arm having a portion thereof received selectively between said first lug and the adjacent end of said recess and between said second lug and adjacent end of said slide plate, said crank arm being integrally connected with the means to effect adjusting movement of the plate mounted within said brackets for adjustment thereof.

References Cited in the file of this patent

UNITED STATES PATENTS

| | | |
|---|---|---|
| 2,535,414 | Heidger | Dec. 26, 1950 |
| 2,547,143 | Speicher | Apr. 3, 1951 |
| 2,550,303 | Simpson | Apr. 24, 1951 |
| 2,661,955 | Sherer | Dec. 8, 1953 |
| 2,672,259 | Hobgood | Mar. 16, 1954 |